Oct. 25, 1960 J. S. ZANDELIN 2,957,260

TELEPHONE SUBSCRIBER'S INDEX

Filed Sept. 8, 1959 2 Sheets-Sheet 1

INVENTOR
JOHAN SAMUEL ZANDELIN
By Irwin S. Thompson
ATTY.

TELEPHONE SUBSCRIBER'S INDEX

Filed Sept. 8, 1959

2 Sheets-Sheet 2

INVENTOR

JOHAN SAMUEL ZANDELIN

BY Irwin S. Thompson

ATTY.

United States Patent Office 2,957,260

Patented Oct. 25, 1960

2,957,260

TELEPHONE SUBSCRIBER'S INDEX

Johan Samuel Zandelin, Gammelgardsvagen 20, Stockholm K, Sweden

Filed Sept. 8, 1959, Ser. No. 838,621

Claims priority, application Sweden Sept. 16, 1958

4 Claims. (Cl. 40—104)

The present invention relates to a telephone subscriber's index which is preferably intended to constitute a base plate for supporting a portable telephone set and in which the numbers of various telephone subscribers may be entered on index cards and these cards can be made visible when one wants to know the number of any given subscriber.

The telephone index according to the invention is mainly characterized in that it comprises a flat casing within which a plate is slidable along guides for the withdrawal of a selectable number of index cards from a pile of cards supported on the guides and on which cards the numbers of telephone subscribers may be noted, there being pivotally mounted on a shaft at the underside of the plate a number of double-armed levers, the front ends of which, when the plate is pushed into the casing, are individually accessiblbe for manual actuation, and the rear ends of which are formed with upstanding heads having each rotatably mounted in it a roller projecting slightly above the top surface of the head, and the plate is provided at the rear ends of the levers with an opening which, by pivoting the levers, the heads with their rollers, being normally in an inoperative position below the top surface of the plate, may be caused to project upwards, and the index cards are provided at their rear edges with recesses, respectively, the widths of which increase in such a way from one card to the next succeeding one that, upon actuation of any one lever, the roller-carrying head of this lever is moved upwards through said recesses of a number of index cards corresponding to the position along the shaft of the lever in question and, upon withdrawal of the plate from the casing, will retract these cards, while the remaining index cards will be urged by the roller against the underside of the top wall of the casing so as to be retained within the casing by its frictional engagement with this wall during the withdrawal of the plate.

To elucidate the invention, reference is made to an embodiment thereof illustrated by way of example in the accompanying drawing, in which.

Figures 1, 2:
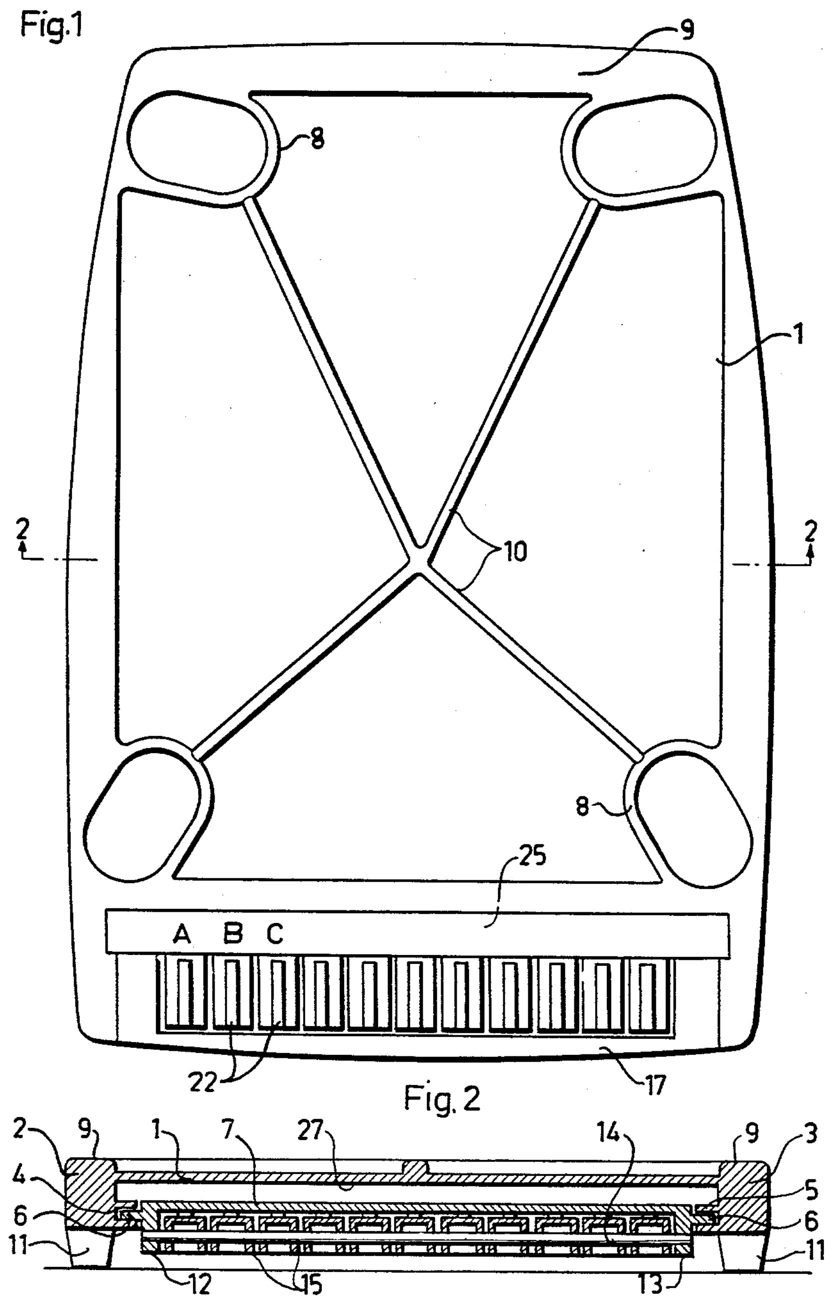
Fig. 1 is a plan view of the telephone subscribers' index.
Fig. 2 shows a cross-sectional elevation through the outer casing taken along the line 2—2 in Fig. 1.

In Figs. 1 and 2, numeral 1 designates a flat, box-shaped casing which has no front end wall and which may suitably be completely open in the downward direction. Provided on the inner surface of the longitudinal side walls 2 and 3 of the casing are guides 4 and 5 for receiving corresponding tongue-shaped edges 6 of a plate 7 which is adapted to be pushed into the casing 1 from its open front end is intended to support a pile of index cards. The casing 1 stands on rubber feet which are designated by 11.

The upper side of the casing 1 may suitably be formed with annular beads 8 adapted to receive the rubber feet of a portable telephone set of the table type so as to prevent the same from sliding sidewise on the casing. If desired, the upper surface of the casing may be provided also with a reinforcement bead 9 extending around its edge, as well as with further reinforcement beads 10.

The plate for retracting the index cards (Figs. 2 to 5) consists of a flat sheet of material, 7, provided with the above-mentioned edge tongues 6 co-operating with the guides 4 and 5 in the casing and having inwardly of these tongues two depending side walls 12 and 13. Extending between these side walls is a shaft 14 on which a number of levers 15 are individually pivotally mounted.

The plate 7 is provided in its rear short end with a rectangular recess 16 and has at its frontmost short end an elevated platform-like portion 17 serving as a handle for pushing the plate into, and retracting the same from, the casing 1. This portion 17 is also provided with a rectangular recess 18.

The levers 15 extend from the rear rectangular recess 16 to the front rectangular recess 18. The levers are formed at their rear ends with upstanding forked heads 19, and in each such head a roller 20 is easily rotatably mounted on a pin 21. The levers 15 are provided at their front ends with buttons or keys 22 by which they can be actuated and thus rotated to a limited extent about the shaft 14.

The index cards 23 (Fig. 6) are identical in size, however each card is formed at its rear edge with a rectangular recess 24 which is differently wide in the various cards. The recesses 24 all begin at the same distance *a* from the left-hand edge of the cards, but whereas the uppermost card (A) has a recess of a width corresponding substantially to the width of one forked head 19, the second card (B) in turn has a recess of a width corresponding substantially to the width of two forked heads 19, the third card (C) has a recess of a width corresponding substantially to the width of three forked heads 19, etc. All the index cards 23 are put together in the form of a pile and are placed resting on the guides 4 and 5 on top of the plate 7 within the casing 1 so as to cover each other perfectly and to dispose the recesses 19 in a superimposed interrelation.

The levers 15 normally occupy by gravity the position shown in Fig. 4 and in which their heads 19 with the rollers 20 slightly projecting therefrom are situated below the flat upper surface of the plate 7. From this position the levers 15, by depressing the corresponding keys or buttons 22, can be pivoted individually into the position shown in Fig. 5 and in which the heads 19 with their rollers 20 project above the upper surface of the plate 7.

The number of index cards 23 corresponds to the number of levers 15. Each card may be allotted to a definite initial letter (A, B, C, D, etc.) of the name of those telephone subscribers whose telephone numbers are to be noted on the cards, but normally two or more initial letters could be put together on one single card, so that it will be possible to come off with a smaller number of cards, and thus with a smaller number of levers 15. Provided behind the buttons or keyboard 22 at the front edge of the plate 7, on the casing proper, 1, is a marking plate 25 on which the initial letter or letters for the various cards are labelled opposite the corresponding keys or buttons 22.

Figures 3, 4, 5, 6:
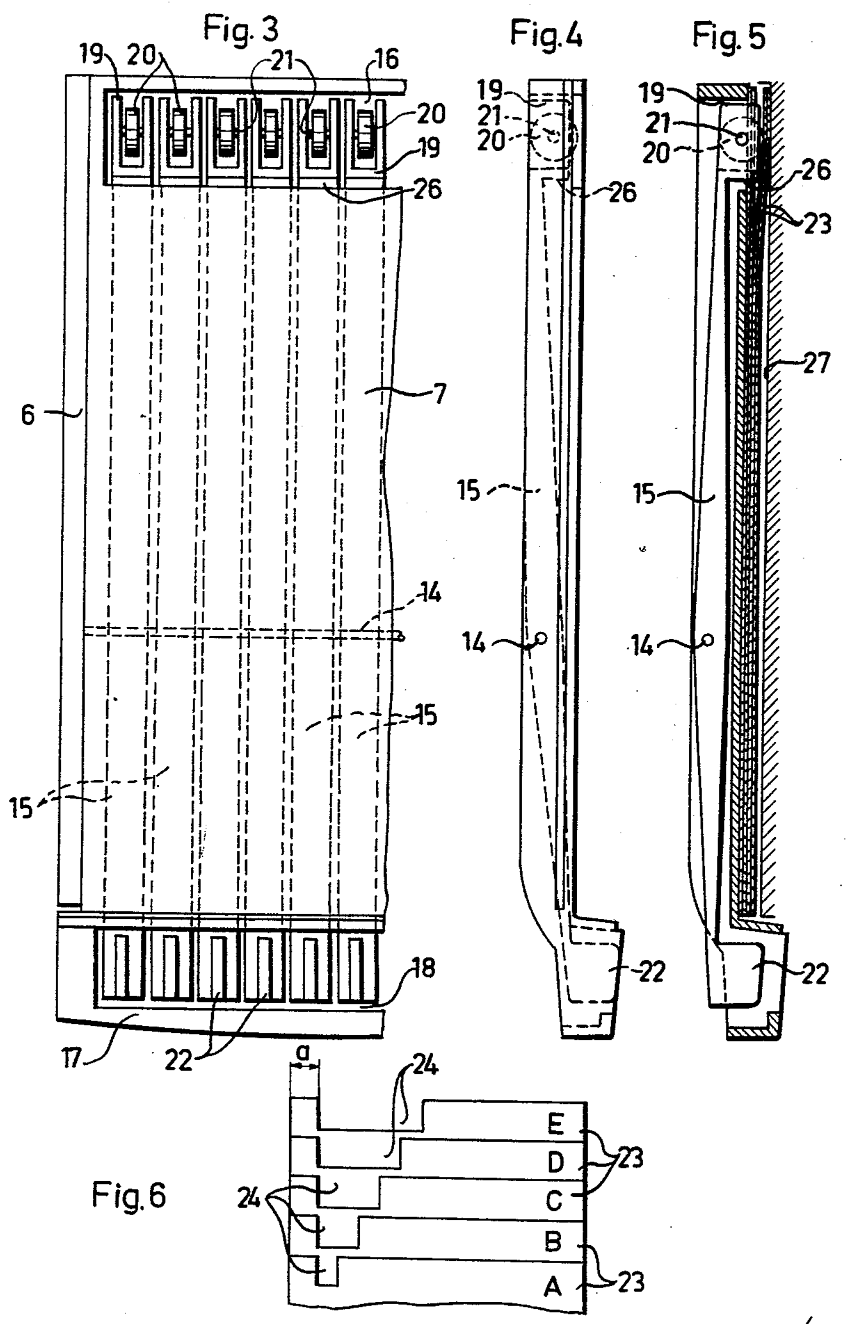
Fig. 3 is a plan view of a plate running on guides within the outer casing and serving for the retraction of index cards.
Fig. 4 is a side view of the plate and shows one of the levers serving for gripping the index cards in its inactive position.
Fig. 5 is a similar view illustrating the same lever in its active position.
Fig. 6 shows a plurality of index cards which have been displaced relative to each other to display the differently sized recesses at the rear edges of the cards.

The operation is as follows:

On depressing, for example, the key 22 corresponding to the letter A on the marking plate 25, the corresponding lever 12 is pivoted from the position shown in Fig. 4 into the position shown in Fig. 5, whereby its head 19 is raised through the recesses 24 of all the index cards 23. Consequently, on the subsequent withdrawal of the plate 7, all the index cards will be gripped by the front-end face or edge 26 of the head 19 and will thus accompany the plate on its withdrawal, the card corresponding to the initial A lying uppermost and displaying the subscribers' numbers noted on this card.

On the other hand, if the key 22 corresponding to the letter B on the marking plate 25 is depressed, causing pivoting of its corresponding lever 15, then the head 19 of the lever will be raised through the recesses 24 of all the index cards except the card corresponding to the letter A, the recess of which is not in alignment with this head. As a result, the roller 20 slightly projecting from the head 19 of the lever will urge the card A upwards against the underside 27 of the top wall of the casing 1, as shown in Fig. 5. During the subsequent withdrawal of the plate 7, the card A will be retained by its frictional engagement with said underside 27, whereas all the remaining index cards will accompany the plate on its withdrawal. Thus the card B will lie uppermost thus displaying the subscribers' numbers noted thereon. During the withdrawal, the roller 20 will be running on the underside of the card A. The procedure will be identical upon depression of the remaining keys 22, i.e. during the withdrawal of the plate 7, only that portion of the pile of cards will be retracted which has the card corresponding to the key concerned uppermost, while the remaining cards will be urged against the inner wall 27 of the casing and thus will be retained within the casing.

Various modifications of the arrangement thus described are, of course, conceivable within the scope of the claims. Although the arrangement is primarily intended for use as a telephone subscribers' index, it is, of course, adaptable for other similar purposes.

What I claim is:

1. In a telephone subscriber's index, a flat casing comprising an upper wall and side walls, guides provided on said side walls, a plate slidably mounted in said guides, said plate being provided with an aperture at its rear end and having downwardly projecting side members, a transverse shaft extending between said side members, a number of double-armed levers individually rotatably mounted on said shaft, the front ends of said levers being accessible at the front end of the casing for manually rotating the levers when the plate is located within and covered by the casing, and the rear ends of said levers being provided with upstanding heads and with rollers rotatably mounted in said heads and projecting slightly from the top surface of the heads, a pile of index cards resting on said slidable plate, each card having at its rear edge an opening and said openings having a width which increases from the topmost to the lowermost card by predetermined amounts, whereby actuation of one of said levers will cause its head to be moved upwardly through the aperture at the rear end of the slidable plate and through the openings of a number of index cards corresponding to the position of said lever on the transverse shaft, so that when the plate is pulled the said number of cards will be carried along with the plate whereas the remaining index cards will be urged against the upper wall of the casing by the roller mounted on the said lever and will be frictionally held in the casing while the roller rolls on the same.

2. A telephone subscriber's index as claimed in claim 1 in which the rear heads of the levers are forked, and the rollers are each rotatably mounted on a pin extending between the limbs of the fork.

3. A telephone subscriber's index as claimed in claim 1 in which the levers are rotatably mounted on the shaft at a point which is so located between the ends of each lever that the lever by gravity tends to rotate in a direction to lower its head and the roller carried by the same.

4. A telephone subscriber's index as claimed in claim 1 in which the plate carrying the levers has a box-shaped position at its front end which position projects from the casing and is provided with an opening through which the front ends of the levers are accessible.

References Cited in the file of this patent

UNITED STATES PATENTS

| | | |
|---|---|---|
| 2,148,409 | Scholl | Feb. 21, 1939 |

FOREIGN PATENTS

| | | |
|---|---|---|
| 965,755 | France | Feb. 22, 1950 |